Dec. 16, 1930.    R. E. McGEE    1,785,489
SPRING
Filed Aug. 27, 1928    2 Sheets-Sheet 1
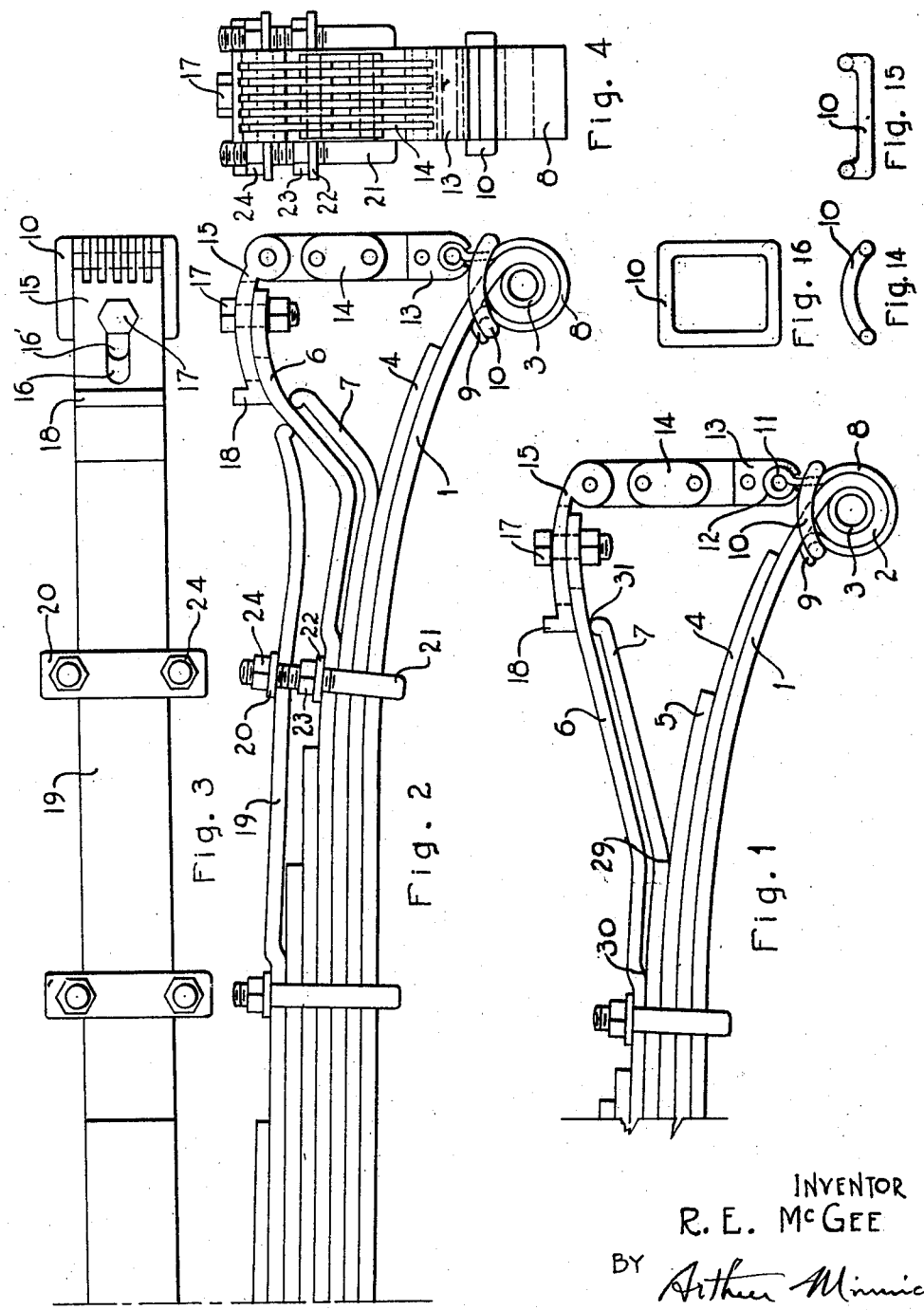
INVENTOR
R. E. McGEE
BY Arthur Minnick
ATTORNEY

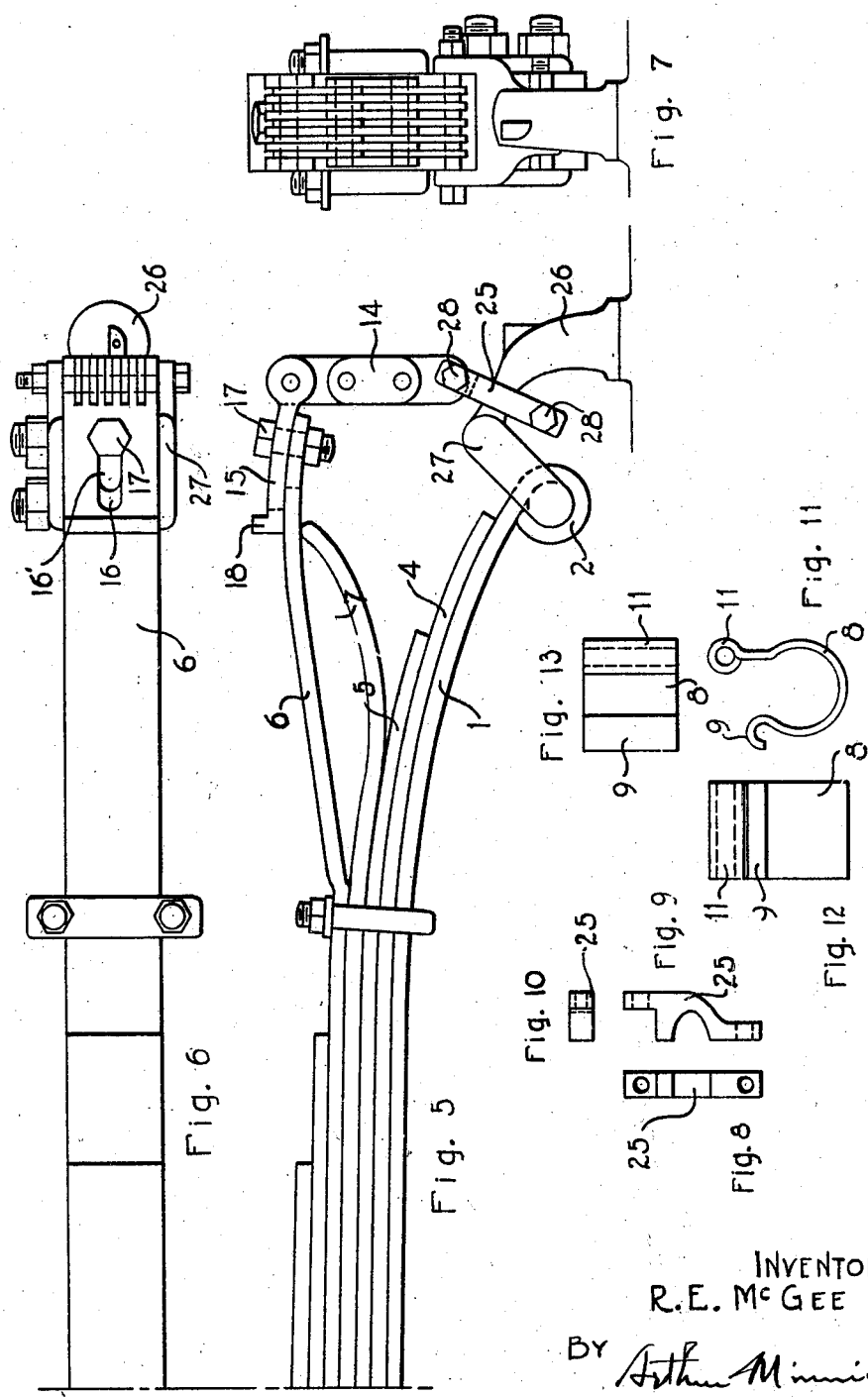

Patented Dec. 16, 1930

1,785,489

UNITED STATES PATENT OFFICE

RUPERT E. McGEE, OF TAMPA, FLORIDA, ASSIGNOR OF ONE-HALF TO D. E. WALTERS

SPRING

Application filed August 27, 1928. Serial No. 302,249.

The principal object of this invention is to provide a spring for automobiles and similar vehicles in which portions of the spring act as snubbers to prevent excessive rebound of the vehicle.

A further object of the invention is to provide a spring in which certain leaves act as reinforcing members in downward movement and also as snubbers against upward movement.

A still further object of the invention is to provide a spring formation of the kind described into which the spring assemblies ordinarily supplied as standard equipment may readily be converted by the removal of some of the leaves and their replacement by others of a different configuration, obviating the necessity for making any change in any other part of the automobile and allowing alterations to be made quickly and at a low cost for labor.

These and further objects are accomplished by placing in a compound spring a leaf or leaves having the outer end portions bent in a direction away from the curvature of the main spring leaves and connecting the reversely bent outer ends with the outer ends of the main leaves, by means of flexible elements such as chains, the members being held under tension by the flexible elements when in their normal condition. When the main spring leaves are flexed by an upward movement of the axle, the chains, stretched by the tension of the reversely bent end portions of the leaves, remain taut until these parts reach the position they would assume if not restrained by the chains, and if the main leaves continue their flexure under the inertia of the load they bear, the chains will bend out of the path of movement of the ends of the main spring leaf. As the main leaf begins to recoil from its point of extreme flexure and begins to overcome the inertia of its load which caused it to bend, the chains will again become taut and further return of the main leaf to its normal position will be resisted by the tension of the reversely bent end portions.

In the drawings, Figure 1 is a side elevation of one end of an automobile spring, showing a preferred form of the invention; Fig. 2 is a side elevation of a modified form; Fig. 3 is a plan view and Fig. 4 an end view of the structure shown in Fig. 2; Fig. 5 is a side elevation of still another form intended for use with another type of automobile spring suspension; Fig. 6 is a plan view and Fig. 7 an end view of the structure shown in Fig. 5; Figs. 8, 9, and 10 are end, side, and top views respectively of the clip used with the spring of Fig. 5; Figs. 11, 12, and 13 are end, side, and top views respectively of the form of clip used in Figs. 1 and 2; and Figs. 14, 15, and 16, are end, side, and top views respectively of a securing member used with the clip shown in Figs. 11 to 13.

In the portion of one end of a spring shown in Fig. 1, the leaf 1 is coiled at its end to form a loop 2, within which is held a bushing 3, as is the common practice in automobile springs. Supplemental leaves 4 and 5, progressively shorter than the leaf 1 and curved in the same direction reinforce the leaf 1. An additional leaf 6 lies parallel with leaves 1, 4, and 5 as far as the point 30 and a supplemental leaf 7 lies parallel with leaves 1, 4, and 5, as far as the point 29. The outer end portions of the leaves 6 and 7 are bent away from the ends of leaves 1, 4, and 5, and the reversely bent portion of the leaf 7 is somewhat shorter than that of the leaf 6.

When the spring is assembled, a clip 8 is slid sidewise on the coiled end of the leaf 1, this clip being formed with a hooked end 9 to engage with a securing member 10 which has previously been placed upon the leaf 1. The opposite end of the clip 8 is coiled upon itself as indicated at 11. After the securing member 10 has been brought into engagement with the hook 9 and swung over the coiled end 11 of the clip, the bore 12 of a terminal member 13 of a chain 14 will be slid axially of the coiled end to attach the clip to the chain. The chain 14 will preferably be formed of a plurality of flat links pivoted to each other and to the slotted terminal members 13 and 15. The surface of the outer end of the leaf 6 is curved on a circular arc and the terminal member is similarly curved for sliding adjustment thereon, the member 15 being provided with a slot 16, and the spring leaf 6 also preferably being provided with a slot 16' for the reception of the bolt 17 which secures the member 15 in adjusted position. A lug 18 formed on the end of the member 15 remote from the chain provides a point of attachment for any suitable tool that may be used to pull the member 15 lengthwise of its seat upon the spring until the chain 14 has been adjusted to secure a desired tension of the spring leaves. Upon downward movement of the load causing flexure of the spring leaves of the whole assembly, the leaves 6 and 7 will act at first as if they terminated at the points 29 and 30, though the contact of the rounded end of the leaf 7 at 31 upon the leaf 6 will cause the portion of the leaf 6 between the point 30 and its end to exert additional pressure at the point 29, since the end of the leaf 6 is held by the chain 14.

In the modification shown in Figs. 2 and 3, a supplemental leaf 19 upon the farther side of the leaf 6 from the leaf 1, is held in position and adjusted by the cross bar 20 of a clip 21. The clip is shown as having a second cross bar 22 and nuts 23 holding four leaves together and having nuts 24 forcing the cross bar 20 against the leaf 19 to adjust its pressure on the spring leaf 6. This supplemental leaf will act only as the main leaf approaches the point of extreme flexure and provides additional resistance capable of adjustment. A further modification shown in Fig. 5 has the spring leaves 1, 4, 5, 6, and 7 of substantially identical construction with the correspondingly numbered leaves in Fig. 1, but the chain 14 is not attached to the coiled end of the leaf 1, but is instead attached by means of the clip 25 to the perch 26 to which the leaf 1 is pivoted by means of the shackle 27. The clip 25 is preferably made of two similar parts secured together by bolts 28.

In the type of structure shown in Fig. 2, the leaf 5 has been omitted, and it will be obvious that this invention is not dependent upon the use of any specific number of leaves in any specific location, or upon bending the end outwardward on any specific leaf or leaves of a series, or in the location of the reinforcing leaf 19 at any specific place in the series, or in the use of any specific total number of leaves, as this will be a matter of calculation and will vary with the weight of the vehicle and with the stresses to which the springs are to be subjected. The arrangement shown in Figs. 1 and 2 will normally be applied to both ends of the springs but may be used on one end only in certain cases. The spring leaf 19 may be omitted if desired, as shown in Figs. 1 and 5, but will ordinarily be used with all types.

The principles of this invention may be applied to semi-elliptic, full elliptic, cantilever, or any other type of spring suspension in which a laminated spring is used, by the removal of selected leaves and their replacement by a suitable replacement unit consisting of a leaf or leaves having a portion of a configuration and size substantially the same as those of the leaves removed, and having further portions of a configuration to form the main snubbing leaf, the supplemental snubbing leaf, or the supplemental leaf 19 for additional resistance, and the flexible member with its attaching means.

I claim:

1. A laminated spring consisting of a main leaf and a plurality of shorter leaves, and a snubbing leaf having its end spaced from the end of the main leaf and connected therewith under tension by means including a flexible element having a terminal member adjustable longitudinally of the snubbing leaf.

2. A laminated spring consisting of a main leaf, a plurality of leaves shorter than the main leaf, and a snubbing leaf having a curved end spaced from the end of the main leaf and connected thereto by means including a flexible element having a curved terminal member adjustably secured upon the curved end of the snubbing leaf, and means for adjustment of the tension between the two ends of the leaves.

3. A laminated spring having a main leaf, a plurality of supplemental shorter leaves, a snubbing leaf having its outer end spaced from the end of the main leaf and connected thereto under tension by a flexible element, and a supplemental leaf having its outer end arranged to contact with the face of the snubbing leaf remote from the main leaf and having means for adjusting the tension of the supplemental leaf.

4. A structure as in claim 3, having means for adjusting the tension of the snubbing leaf.

5. A replacement unit for one of the supplemental leaves of a laminated spring consisting of a spring leaf having a portion of a size and configuration conforming to that of the leaf it is intended to replace and another portion having a configuration such that when assembled with the remaining leaves the free end will be spaced from the end of the main leaf, and a flexible member having adjustable means for attachment to the end of the replacement leaf to adjust the tension of the snubbing leaf, and having means for attachment to an element connected with the end of the main leaf.

6. A replacement unit for a laminated spring having a main leaf and a plurality of shorter supplemental leaves, consisting of a main snubbing leaf having a portion of a size and configuration conforming to that of the leaf it is intended to replace and another portion having a configuration such that when assembled with the remaining leaves its free end will be spaced from the end of the main leaf, and a supplemental snubbing leaf between the main leaf and the main snubbing leaf having a portion of a size and configuration conforming to that of the leaf it is intended to replace and having another portion so shaped that when assembled its free end will be in contact with a face of the main snubbing leaf, and a flexible member having means for attachment to the end of the main leaf and to the end of the main snubbing leaf the attachment to the snubbing leaf being adjustable to vary the tension of said leaf.

In testimony of which, I affix my signature.

R. E. McGEE.